Dec. 27, 1955  S. VORECH  2,728,592
BRAKE CHAMBER PUSH ROD SEAL
Filed April 27, 1953
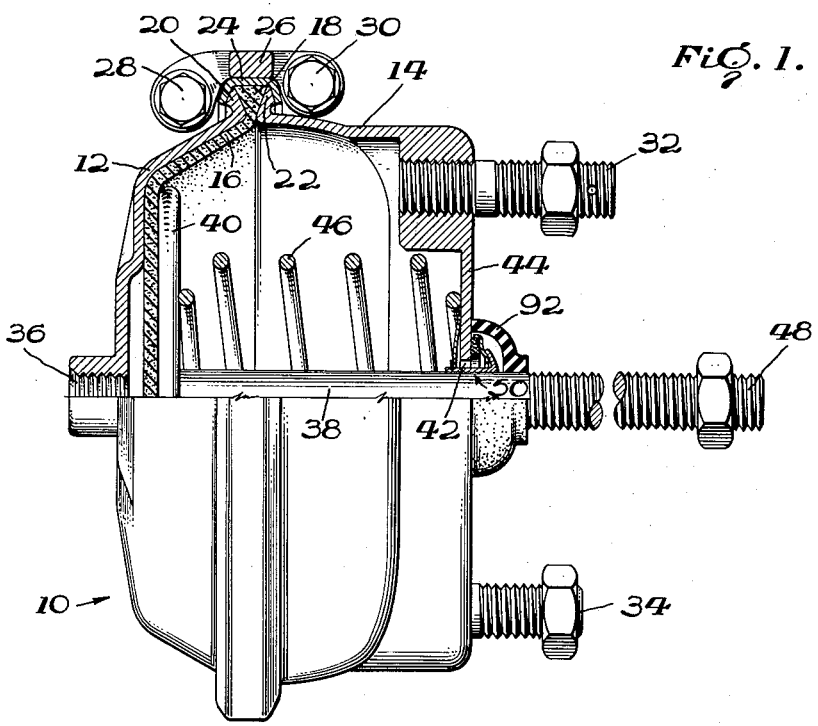
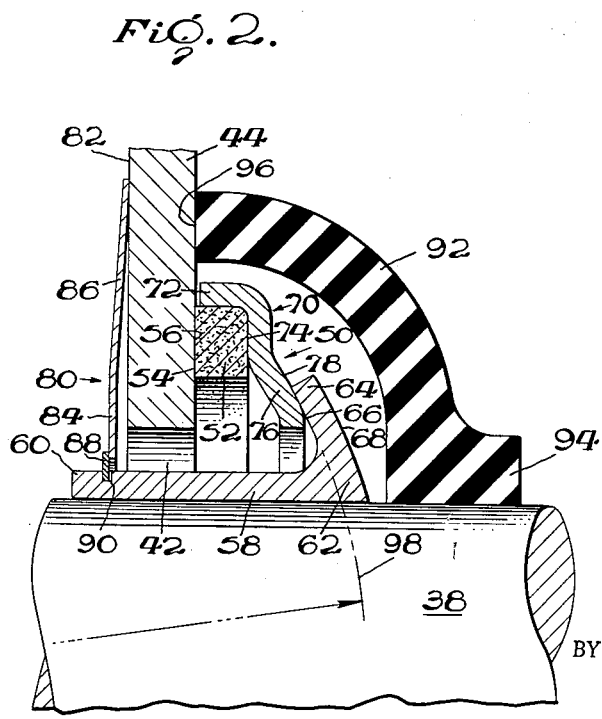
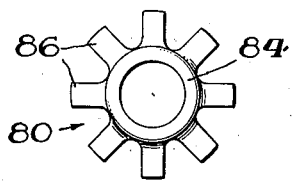
INVENTOR
Stephen Vorech
BY
Scrivener & Parker
ATTORNEYS

United States Patent Office 2,728,592
Patented Dec. 27, 1955

2,728,592

BRAKE CHAMBER PUSH ROD SEAL

Stephen Vorech, Elyria, Ohio, assignor to Bendix-Westinghouse Automotive Air Brake Company, Elyria, Ohio, a corporation of Delaware Application April 27, 1953, Serial No. 351,460

6 Claims. (Cl. 286—15)

This invention relates to a shaft seal assembly and more particularly to a seal which may be particularly adapted for use in connection with the push rods of brake chambers or actuators of the fluid pressure actuated type.

One of the objects of the present invention is to provide a novel seal construction for sealing a fluid pressure actuator against the entrance of dust, dirt and water, which might otherwise seriously impair the efficient operation of the actuator, especially when in use in connection with fluid pressure systems for vehicle brakes.

Another object is to provide a novel seal construction of the above character which may be quickly installed on the push rod of the actuator and which effectively cooperates with the rod and the end wall of the actuator to prevent the entrance of dirt and water thereto, notwithstanding that the push rod moves axially and laterally within an enlarged opening in the end wall of the actuator during operation of the latter.

A further object is to provide in a seal of the foregoing type, a novel arrangement embodying relatively few parts, these being of comparatively simple construction but capable of long periods of effective sealing operation without requiring any attention on the part of the operator.

Other objects and novel features of the invention will appear more fully hereinafter from a consideration of the following description when taken in connection with the accompanying drawing. It is to be expressly understood however, that the drawing is utilized for purposes of illustration only, and is not to be taken as a definition of the limits of the invention, reference being had for this purpose to the appended claims.

In the drawing, wherein similar reference characters refer to similar parts throughout the several views:

Fig. 1 is a side view of a fluid pressure actuator, partly in section, and illustrating the novel seal construction of the invention;

Fig. 2 is an enlarged, partial view in section of the seal of Fig. 1; and

Fig. 3 is a plan view of the spring member constituting one of the elements of the seal assembly.

Referring more particularly to Fig. 1, the novel seal construction of the present invention is illustrated therein as being associated with a fluid pressure actuator 10 of the type which may be especially adapted for use in connection with compressed air braking systems for automotive vehicles. Such actuator is formed from a pair of dished plates 12 and 14 between which a flexible diaphragm 16 is clamped in any suitable manner. For example, the diaphragm 16 may be provided with a peripheral bead 18 which is received between opposed flanges 20 and 22 of the respective plates 12 and 14 and such flanges, with the bead portion 18 therebetween, may be suitably clamped together as by means of a clamping strap 24, opposite ends of which are provided with lugs, one of which is shown at 26 in Fig. 1. Such lugs may be secured together as by means of bolts 28 and 30.

The plate 14 is preferably provided with suitable studs 32 and 34, to enable mounting of the actuator upon a stationary support, and the plate 12 is provided with a central opening 36 to which a supply of fluid pressure may be connected, such as for example, a supply of compressed air. A push rod 38 having a plate 40 secured at one end thereof, extends through an enlarged opening 42 in the end wall 44 of the plate 14 for the purpose of actuating a part to be actuated and, as shown, the rod 38 and plate 40 are normally maintained in the position illustrated as by means of a spring 46. That portion of the push rod 38 which extends outwardly of the actuator 10 may be threaded at 48 in order that the push rod may be suitably connected to the part to be actuated, such as for example, a slack adjuster of a vehicle braking system.

From the foregoing, it will be apparent that the diaphragm 16, the plate 40 and the push rod 38 will be moved to the right as viewed in Fig. 1, upon the application of compressed air to the opening 36. On the other hand, when the actuating fluid is exhausted from the actuator 10 the spring 46 returns the parts to the normal position illustrated. It will be readily understood that during operation of the actuator 10 the push rod 38 reciprocates through the enlarged opening 42 in the end wall 44. Since the push rod 38 must also be capable of some lateral movement during its reciprocation, as in the case where the rod 38 is connected with a brake slack adjuster, the opening 42 is enlarged with respect to the diameter of the push rod 38 in order to permit such lateral movement.

The present invention is concerned particularly with the sealing of the enlarged opening 42 in order to prevent the entrance of dirt, dust and water into the actuator 10 during operation thereof. Referring more particularly to Fig. 2, the novel seal assembly of the present invention is illustrated at 50 and includes several cooperative elements, all of which surround the push rod 38.

More particularly the seal assembly 50 comprises a sealing disc or washer 52 which is preferably composed of fibrous or rubber material or a combination of these and is annular in shape and preferably rectangular in cross-section in order to provide a flat face 54 which engages the outer face 56 of the end wall 44 around the opening 42.

Novel means are employed for maintaining the surfaces 54 and 56 in firm engagement at all times during operation of the actuator 10 and such means includes a sleeve 58 which slidably engages the push rod 38 and which extends through the opening 42 and is provided with end portions 60 and 62 which are respectively positioned on opposite sides of the end wall 44. The outer end portion 62 is formed with an angularly directed flange or lip 64, such lip having inner and outer faces or surfaces 66 and 68 respectively which are angularly directed toward the outer surface of the wall 44. An intermediate cup-shaped member or holder 70 is interposed between the disc 52 and the lip 64 and includes a peripheral flange 72 which closely embraces the outer peripheral portion of the disc 52. Member 70 is also formed to provide a surface 74 which engages the outer face of the disc 52 and at its central or base portion, the member 70 is formed to provide an angularly directed annular part 76 which is provided with an annular face or surface 78 which engages the surface 66 of the lip 64.

In order to maintain the parts 52, 64 and 70 in the contacting relationship referred to above and shown in Figs. 1 and 2, the invention includes resilient means 80 which is interposed between the inner end portion 60 of the sleeve 58 and inner face 82 of the end wall 44. More particularly, and referring to Figs. 2 and 3, such resilient means comprises a spring washer member having a hub portion 84 surrounding the sleeve 58 and having also a plurality of spring fingers 86 which extend radially outwardly from the hub portion 84. As shown in Fig. 2, the spring fingers 86 are bent toward the wall 44 and out of the plane of the hub portion 84 so as to engage the inner face 82 of the wall 44. The hub 84 may be suitably associated with the end portion 60 of the sleeve 58 such as by engagement with a split locking ring 88 receivable within a grove 90 formed in the sleeve 58. It will be understood, however, that any suitable abutment may be provided on the inner end portion of the sleeve 58 for engagement with the hub 84 of the resilient means 80, the arrangement being such, however, that after assembly of the parts, the tension of the spring fingers 86 will be sufficient to maintain the elements 52, 64 and 70 of the seal assembly in firm contact with each other.

One of the important features of the seal assembly includes the provision of an arrangement whereby the lip 64 and the part 76 will be maintained in surface area engagement during any lateral or rocking movement of the push rod 38 with respect to the enlarged opening 42. In order to secure this desirable result, the face 78 of the member 70 and the associated face 66 of the lip 64 are spherically formed about a radius, the center of which is coincident with the axis of the push rod 38 and lies within the actuator when the latter is in the inoperative condition shown in Fig. 1. In other words, the faces 78 and 66 are complementary, that is, face 78 is convex and the face 66 is correspondingly concave. With such an arrangement, as the push rod 38 rocks in the enlarged opening 42 during its operation, the faces 66 and 78 will move relatively to each other and the same will be maintained in surface engagement at all times through the action of the resilient means 80.

A further feature of the invention resides in the angularity and the extent of the outer face 68 of the lip 64. Preferably such face is continued inwardly to the push rod 38 in order to provide an annular surface, which may be spherical in the manner of faces 78 and 66 and which joins the exterior surface of the push rod at an acute angle. Such an arrangement materially facilitates the sealing qualities of the seal assembly. If desired, a flexible rubber boot or shield 92 may be utilized, said boot being provided with a hub portion 94 frictionally gripping the push rod 38 and being also provided with an annular surface 96 engaging the outer face 56 of the plate 44 when the parts are in the neutral position shown in Fig. 1. The use of such a boot materially contributes to the effectiveness of the seal assembly when the actuator is subject to the action of water and dirt when in inoperative condition.

It is believed that the assembly and operation of the invention will be readily understood from the foregoing description. The seal assembly 50 comprises relatively few parts which are of relatively simple construction and the assembly of the elements may be quickly and readily effected. The sealing disc 52 provides an effective seal by reason of the cooperation between the surfaces 54 and 56. A further effective seal is provided by the co-acting spherical surfaces 78 and 66 respectively provided on the member 70 and the lip 64 of the sleeve 58. This latter seal is moreover so arranged as to maintain its effectiveness notwithstanding lateral or rocking movements of the push rod 38 during operation of the actuator 10. As will be clearly shown in Fig. 2 by the dotted line 98, the spherical surfaces 78 and 66 are complementary to each other and are formed on a radius as indicated in the foregoing.

While the invention has been described herein with considerable particularity, it will be readily understood by those skilled in the art that various modifications may be resorted to without departing from the spirit of the invention. Reference will therefore be had to appended claims for a definition of the limits of the invention.

What is claimed is:

1. In a fluid pressure actuator of the type having an actuating rod axially movable in opposite directions and wherein said rod extends through an enlarged opening in one of the walls of the actuator to allow lateral movement of the rod during axial movements thereof, the improvement which comprises a packing seal assembly surrounding said rod and including an annular sealing disc having one face thereof engaging the outer face of said wall around said opening, a cup-shaped member provided with an annular flange engaging the peripheral portion of said disc and provided also with a part engaging the opposite face of said disc, said member also having a spherical outer surface, a sleeve slidably mounted on the shaft and having an annular lip provided with a spherical surface engaging the spherical outer surface of said member, and resilient means associated with said sleeve and the inner face of said wall for maintaining said disc in sealing engagement with the outer face of said wall.

2. The improvement as set forth in claim 1 wherein said resilient means comprises an annular hub portion surrounding said sleeve and a plurality of spring fingers extending radially of said hub portion, said fingers being bent toward the inner face of said wall and having the outer ends thereof engaging said wall around said opening.

3. In a fluid pressure actuator of the type having an actuating rod axially movable in opposite directions and wherein said rod extends through an enlarged opening in one of the walls of the actuator to allow lateral movement of the rod during axial movements thereof, the improvement which comprises a packing seal assembly surrounding said rod and including an annular sealing disc having one face thereof engaging the outer face of said wall around said opening, and means for maintaining said disc in sealing engagement with the outer face of said wall while allowing axial and lateral movements of said rod, comprising a sleeve slidably mounted on said shaft and extending freely through said opening on opposite sides of said wall, the outer end of said sleeve extending beyond said disc and formed with an angularly directed annular lip provided with a concave inner annular surface, a member positioned between said disc and lip and having angularly related portions respectively engaging the periphery of the disc and the opposite face thereof, said member also having a base portion provided with a convex outer annular surface engaging said concave surface of said lip, and a spring interposed between the inner face of said wall and the inner end of said sleeve.

4. The improvement as set forth in claim 3 wherein said spring comprises an annular hub portion surrounding said sleeve and a plurality of spring fingers extending radially of said hub portion, said fingers being bent toward the inner face of said wall and having the outer ends thereof engaging the wall around said opening.

5. In a fluid pressure actuator of the type having an actuating rod axially movable in opposite directions and wherein said rod extends through an enlarged opening in one of the walls of the actuator to allow lateral movement of the rod during axial movements thereof, the improvement which comprises a packing seal assembly surrounding said rod and including an annular sealing disc having one face thereof engaging the outer face of said wall around said opening, and means for maintaining said disc in sealing engagement with the outer face of said wall while allowing axial and lateral movements of said rod, comprising a sleeve slidably mounted on said shaft and extending freely through said opening on opposite sides of said wall, said sleeve having an annular flange at the outer end thereof, said flange extending toward the outer face of said wall and having inner and outer surfaces, said outer surface being arranged at an acute angle with respect to said rod, and extending to the outer surface of the latter, said inner surface of the flange being spherical, a member positioned between said disc and flange and having portions respectively engaging the periphery of the disc and the opposite face thereof, and having also a base portion provided with a spherical outer surface complementary to and engaging the inner surface of said flange, and a spring interposed between the inner face of said wall and the inner end of said sleeve.

6. The improvement as set forth in claim 5 wherein said spring comprises an annular hub portion surrounding said sleeve and a plurality of spring fingers extending radially of said hub portion, said fingers being bent toward the inner face of said wall and having the outer ends thereof engaging the wall around said opening.

References Cited in the file of this patent

UNITED STATES PATENTS

| | | |
|---|---|---|
| 1,618,882 | Kendall | Feb. 22, 1927 |
| 1,740,682 | Carrey | Dec. 24, 1929 |
| 1,771,854 | Lyman | July 29, 1930 |
| 1,862,887 | Durdin | June 14, 1932 |
| 2,465,499 | Voytech | Mar. 29, 1949 |